United States Patent
Creelman et al.

(10) Patent No.: US 11,179,918 B2
(45) Date of Patent: Nov. 23, 2021

(54) EXTERIOR BUILDING COMPONENT AND METHOD FOR MANUFACTURING THE SAME

(71) Applicant: MARWOOD LTD., Fredericton (CA)

(72) Inventors: Douglas Creelman, Nova Scotia (CA); Adrian Stanese, Burnaby (CA); Grace Sun, Richmond (CA); Marek Gnatowski, Coquitlam (CA); Mathew Leung, Burnaby (CA); Ying-Hei Chui, Edmonton (CA)

(73) Assignee: MARWOOD LTD., Fredericton (CA)

( * ) Notice: Subject to any disclaimer, the term of this patent is extended or adjusted under 35 U.S.C. 154(b) by 0 days.

(21) Appl. No.: 16/639,695

(22) PCT Filed: Aug. 16, 2018

(86) PCT No.: PCT/CA2018/000156
§ 371 (c)(1),
(2) Date: Feb. 17, 2020

(87) PCT Pub. No.: WO2019/033196
PCT Pub. Date: Feb. 21, 2019

(65) Prior Publication Data
US 2020/0238669 A1   Jul. 30, 2020

(30) Foreign Application Priority Data
Aug. 18, 2017   (CA) .................... CA 2976847

(51) Int. Cl.
*B32B 7/12*   (2006.01)
*B32B 21/08*   (2006.01)
(Continued)

(52) U.S. Cl.
CPC ............ *B32B 21/08* (2013.01); *B32B 7/12* (2013.01); *B32B 27/16* (2013.01); *B32B 27/32* (2013.01);
(Continued)

(58) Field of Classification Search
CPC . B29C 2063/485; B29C 59/046; B29C 63/02; B29C 63/48; B32B 21/08;
(Continued)

(56) References Cited

U.S. PATENT DOCUMENTS

2010/0092731 A1* 4/2010 Pervan ................ E04C 2/30
428/172

FOREIGN PATENT DOCUMENTS

EP        2344311         7/2011
WO    2009/124704 A1   10/2009

OTHER PUBLICATIONS

PCT, Canadian Intellectual Property Office (ISA/CA), International Search Report, International Application No. PCT/CA2018/000156, 3 pages, dated Nov. 5, 2018.
(Continued)

*Primary Examiner* — Lawrence D Ferguson
(74) *Attorney, Agent, or Firm* — Thompson Hine LLP

(57) ABSTRACT

An exterior building component with a distinct surface topography and a method for manufacturing the same. A substrate, a barrier film, and an adhesive are provided together with a finishing sacrificial coating. The adhesive has pressure sensitive characteristics in a temperature range including a temperature below barrier film embossment temperature. The temperature of a surface of the substrate and the barrier film is adjusted to the barrier film embossment temperature. The adhesive is disposed onto at least one of the surface of the substrate and the barrier film. The barrier film is then disposed onto the surface of the substrate
(Continued)

and embossed such that the surface topography of the substrate is replicated in a substantially identical fashion using a roller at low pressure and short pressure application time. The barrier film is then, if needed, finished with a weather-resistant coating compatible with commercially available architectural exterior paints and lacquers for refinishing as required.

16 Claims, 3 Drawing Sheets

(51) Int. Cl.
*B32B 27/16* (2006.01)
*B32B 27/32* (2006.01)
*B32B 37/00* (2006.01)
*B32B 37/04* (2006.01)
*B32B 37/12* (2006.01)
*B32B 38/06* (2006.01)
*E04F 13/10* (2006.01)
*B29C 59/04* (2006.01)
*B29C 63/02* (2006.01)
*B29C 63/48* (2006.01)

(52) U.S. Cl.
CPC .......... *B32B 37/0053* (2013.01); *B32B 37/04* (2013.01); *B32B 37/1207* (2013.01); *B32B 38/06* (2013.01); *E04F 13/10* (2013.01); *B29C 59/046* (2013.01); *B29C 63/02* (2013.01); *B29C 63/48* (2013.01); *B29C 2063/485* (2013.01); *B32B 2255/10* (2013.01); *B32B 2307/3065* (2013.01); *B32B 2323/00* (2013.01); *B32B 2363/00* (2013.01); *B32B 2419/00* (2013.01)

(58) Field of Classification Search
CPC ........ B32B 2255/10; B32B 2307/3065; B32B 2323/00; B32B 2363/00; B32B 2419/00; B32B 27/16; B32B 27/32; B32B 37/0053; B32B 37/04; B32B 37/1207; B32B 38/06; B32B 7/12; E04F 13/10; E04F 13/165
See application file for complete search history.

(56) References Cited

OTHER PUBLICATIONS

PCT, Canadian Intellectual Property Office (ISA/CA), Written Opinion of the International Searching Authority, International Application No. PCT/CA2018/000156, 3 pages, dated Nov. 5, 2018.

* cited by examiner

EXTERIOR BUILDING COMPONENT AND METHOD FOR MANUFACTURING THE SAME

This application is a national stage filing of PCT Application No. PCT/CA2018/00156 (Publication No. WO 2019/033196) entitled EXTERIOR BUILDING COMPONENT AND METHOD FOR MANUFACTURING THE SAME and filed on Aug. 16, 2018, which claims priority to Canadian Application No. 2,976,847 entitled EXTERIOR BUILDING COMPONENT AND METHOD FOR MANUFACTURING THE SAME and filed on Aug. 18, 2017. The entire contents of both of these applications are incorporated by reference herein.

FIELD

The present invention relates to building components, and more particularly to an exterior building component with distinct surface texture protected by a water and water vapor barrier film and method for manufacturing the same.

BACKGROUND

In present day construction exterior building components are frequently manufactured using wood, wood-based composite and wood-fiber based composite, or bio-fiber based composite materials with distinct surface texture. They are typically in the form of board-like elements such as, for example, siding, trim or fascia boards for protecting the building envelope against weather elements as well as for providing an aesthetically pleasing appearance of the building. In many types of buildings such as, for example, individual residences, the texture or topography of rough sawn wood is considered 'natural' and having an aesthetically pleasing appearance. Therefore, many exterior building components made of composite or other materials have a texture resembling a wood grain pattern embossed on the exposed surfaces.

Unfortunately, a common problem is the deterioration of these components due to the water absorption associated with the presence of hydrophilic materials and/or their inherent porosity, causing a change in dimensions, increased fungal activity, internal stress build-up resulting in warpage, checking or cracking of the surface, appearance of efflorescence and freeze-thaw damage at sub-zero temperatures. Furthermore, if solid wood is used for manufacturing these components, the surface of certain woods contains loose spike knots, checks, small cracks, as well as loose fibers which require 'repair' during the finishing process.

Typically, present-day factory finished exterior building components are painted for protection from moisture and other weathering elements. However, paint used for factory finishing provides only a good barrier for liquid water but has substantial water vapor permeability of about 10-50 g·mm/day·m$^2$. This leads to moisture absorption by wood of about 15 to 30 Cobb unit as measured for painted smooth pine according to ASTM D5795. Further, rough sawn wood surfaces cannot be covered with a paint layer having a uniform thickness, thus compromising the longevity of the paint layer. Another problem is the development of checks and cracks in wood surfaces, typically causing the paint layer to crack creating paths for water to enter into the wood accelerating its deterioration.

There have been some attempts replacing the painting with laminating a plastic film onto wood surfaces for exterior building components. However, these attempts have various drawbacks such as, for example: the lamination has to be performed using a high pressure or vacuum batch process resulting in inefficient and costly manufacturing; the embossed plastic film does not properly replicate the surface texture, resulting in an aesthetically unappealing appearance; the plastic film used is very stiff and not compatible with dimensionally unstable wood substrates; the film surface is not paintable and cannot be cost effectively finished with a variety of different colors or refinished; or the plastic film is not capable of bridging cracks.

It may be desirable to provide an exterior building component protected by a water and water vapor barrier film with the embossed barrier film replicating the surface topography of the underlying substrate in a substantially identical fashion.

It also may be desirable to provide an exterior building component protected by a water and water vapor barrier film with the barrier film being capable of bridging cracks in the surface of the underlying substrate.

It also may be desirable to provide an exterior building component protected by a water and water vapor barrier film with the barrier film having controlled water vapor permeability to allow slow release of entrapped water, if any, from the component body.

It also may be desirable to provide an exterior building component protected by a water and water vapor barrier film with the embossed barrier film replicating the surface topography of the underlying substrate in a substantially identical fashion that can be easily finished with a variety of different colors or later refinished using traditional architectural paints and lacquers available on the market.

It also may be desirable to provide an exterior building component protected by the water and water vapor barrier film with the embossed barrier film replicating the surface topography of the underlying substrate in a substantially identical fashion wherein the water and water vapor barrier film is UV stabilized to protect the substrate against weather elements in case of temporary damage to the paint finishing.

It also may be desirable to provide a method for manufacturing an exterior building component protected by a water and water vapor barrier film with the embossed barrier film replicating the surface topography of the underlying substrate in a substantially identical fashion that provides a fast and simple in-line process for mass-producing the exterior building component.

It also may be desirable to provide a water and water vapor barrier film for use in a method for manufacturing an exterior building component protected by the water and water vapor barrier film with the embossed barrier film replicating the surface topography of the underlying substrate in a substantially identical fashion that provides a simple in-line process for fast, economical mass-producing the exterior building component finished in a variety of colors and resistant to weather elements.

SUMMARY

Accordingly, in one embodiment the invention provides an exterior building component protected by a water and water vapor barrier film with the embossed barrier film replicating the surface topography of the underlying substrate in a substantially identical fashion.

In another embodiment the invention provides an exterior building component protected by a water and water vapor barrier film with the barrier film being capable of bridging cracks in the surface of the underlying substrate.

In another embodiment the invention provides an exterior building component protected by a water and water vapor barrier film with the barrier film having controlled water vapor permeability to allow slow release of entrapped water, if any, from the component body.

In another embodiment the invention provides an exterior building component protected by a water and water vapor barrier film with the embossed barrier film replicating the surface topography of the underlying substrate in a substantially identical fashion that can be easily finished with a variety of different colors or later refinished using traditional architectural paints and lacquers available on the market.

In another embodiment the invention provides an exterior building component protected by the water and water vapor barrier film with the embossed barrier film replicating the surface topography of the underlying substrate in a substantially identical fashion wherein the water and water vapor barrier film is UV stabilized to protect the substrate against weather elements in case of temporary damage to the paint finishing.

In another embodiment the invention provides a method for manufacturing an exterior building component protected by a water and water vapor barrier film with the embossed barrier film replicating the surface topography of the underlying substrate in a substantially identical fashion that provides a fast and simple in-line process for mass-producing the exterior building component.

In another embodiment the invention provides a water and water vapor barrier film for use in a method for manufacturing an exterior building component protected by the water and water vapor barrier film with the embossed barrier film replicating the surface topography of the underlying substrate in a substantially identical fashion that provides a simple in-line process for fast, economical mass-producing the exterior building component finished in a variety of colors and resistant to weather elements.

According to one aspect of the present invention, there is provided a method for manufacturing an exterior building component. A substrate, a thermoplastic barrier film, and an adhesive are provided. The adhesive has sufficient pressure sensitive characteristics in a temperature range below a barrier film assembly temperature. The temperature of a surface of the substrate and the barrier film is adjusted to the barrier film assembly temperature. The adhesive is disposed onto at least one of the surface of the substrate and the barrier film. The barrier film is then disposed onto the surface of the substrate and embossed such that a surface topography of the substrate is replicated in a substantially identical fashion using at least a roller at low pressure and short pressure application time.

According to one aspect of the present invention, there is provided a method for manufacturing an exterior building component. A substrate, a thermoplastic barrier film, and an adhesive are provided. The adhesive has pressure sensitive characteristics in a temperature range below and including a barrier film assembly temperature. A surface of the substrate is dried to a predetermined moisture content. The temperature of the surface of the substrate and the barrier film is adjusted to the barrier film assembly temperature. The adhesive is disposed onto at least one of the surface of the substrate and the barrier film. The barrier film is then disposed onto the surface of the substrate and embossed such that a surface topography of the substrate is replicated in a substantially identical fashion using at least a roller at low pressure and short pressure application time. Finally, paint or lacquer may be disposed onto the embossed barrier film. Film may be treated prior to coating deposition if required to improve coating film adhesion. The barrier film has: a water vapor permeability in the range of about 0.01 g·mm/day·m$^2$ to about 20 g·mm/day·m$^2$ at 23° C. tested according to ASTM D1653 or ASTM E96; an ultimate elongation at break greater than 20% at 23° C. according to ASTM D822; and, a glass transition temperature in the range below 0° C., with the glass transition temperature measured during a temperature increase at a rate of 2° C./min determined from tan delta curve as tested using a DMA. The adhesive has sufficient green strength when in contact with the surface of the substrate and the barrier film for retaining the barrier film after embossing in a shape replicating the surface topography of the substrate in a substantially identical fashion.

According to one aspect of the present invention, there is provided an exterior building component manufactured using the above method. The exterior building component comprises a substrate having a barrier film disposed onto at least a portion of a textured surface of the substrate and adhered thereto. The barrier film is embossed such that a textured surface topography of the substrate is replicated in a substantially identical fashion.

According to one aspect of the present invention, there is provided an exterior building component. The exterior building component comprises a textured substrate having a barrier film disposed onto at least a portion of a textured surface of the substrate and adhered thereto. The barrier film is embossed such that a surface topography of the substrate is replicated in a substantially identical fashion. The barrier film has: a water vapor permeability in the range of about 0.01 g·mm/day·m$^2$ to about 20 g·mm/day·m$^2$ at 23° C. tested according to ASTM D1657 or ASTM E96; and, a glass transition temperature in one case below 0° C. determined from tan delta curve as tested using a DMA, with the glass transition temperature measured during a temperature increase at a rate of 2° C./min.

An advantage of the present invention is that it provides an exterior building component protected by a water and water vapor barrier film with the embossed barrier film replicating the surface topography of the underlying substrate in a substantially identical fashion.

A further advantage of the present invention is that it provides an exterior building component protected by a water and water vapor barrier film with the barrier film being capable of bridging cracks in the surface of the underlying substrate.

A further advantage of the present invention is that it provides an exterior building component protected by a water and water vapor barrier film with the barrier film having controlled water vapor permeability to allow slow release of entrapped water, if any, from the component body.

A further advantage of the present invention is that it provides an exterior building component protected by a water and water vapor barrier film with the embossed barrier film replicating the surface topography of the underlying substrate in a substantially identical fashion that can be easily finished with a variety of different colors or later refinished using traditional architectural paints and lacquers available on the market.

A further advantage of the present invention is that it provides an exterior building component protected by the water and water vapor barrier film with the embossed barrier film replicating the surface topography of the underlying substrate in a substantially identical fashion wherein the water and water vapor barrier film is UV stabilized to protect the substrate against weather elements in case of temporary damage to the paint finishing.

A further advantage of the present invention is that it provides a method for manufacturing an exterior building component protected by a water and water vapor barrier film with the embossed barrier film replicating the surface topography of the underlying substrate in a substantially identical fashion that provides a fast and simple in-line process for mass-producing the exterior building component.

A further advantage of the present invention is that it provides a water and water vapor barrier film for use in a method for manufacturing an exterior building component protected by the water and water vapor barrier film with the embossed barrier film replicating the surface topography of the underlying substrate in a substantially identical fashion that provides a simple in-line process for fast, economical mass-producing the exterior building component finished in a variety of colors and resistant to weather elements.

BRIEF DESCRIPTION OF THE DRAWINGS

An embodiment of the present invention is described below with reference to the accompanying drawings, in which.

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, certain methods and materials are now described.

While the description of the embodiments hereinbelow is with reference to an exterior building component with a substrate made of wood, wood-based composite, wood-fiber based composite, or bio-fiber based composite materials, it will become evident to those skilled in the art that the embodiments of the invention are not limited thereto, but may also be employed in combination with other substrate materials such as, for example, cement-based materials.

Figure 1:
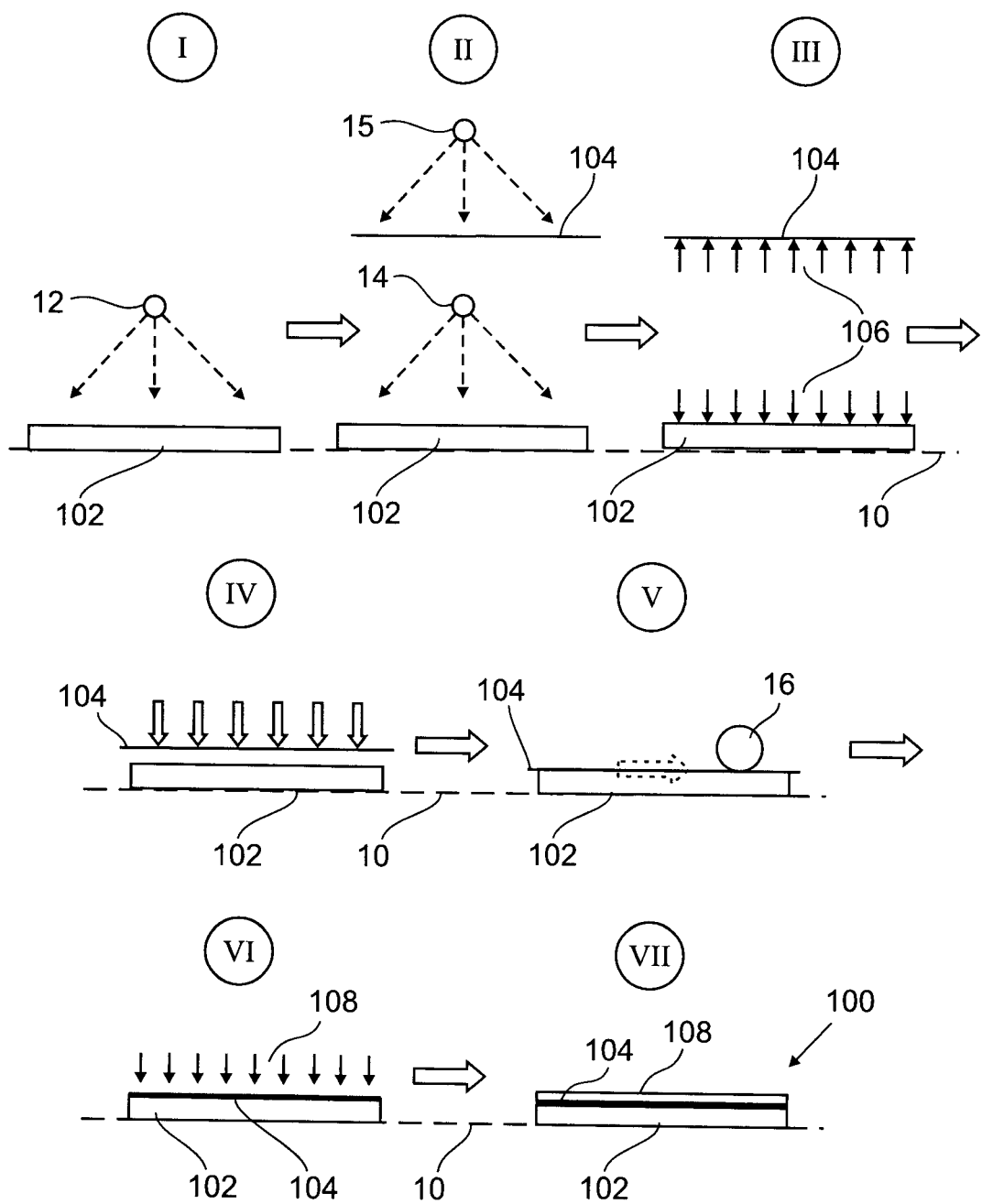
FIG. 1 is a simplified block diagram illustrating in a method for manufacturing an exterior building component according to an embodiment of the invention.
Figure 2:
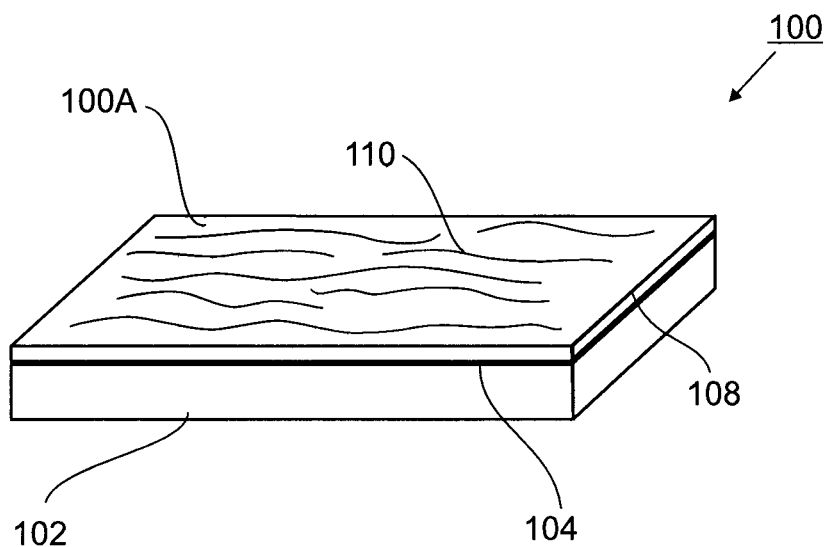
FIG. 2 is a simplified block diagram illustrating in a perspective view an exterior building component according to an embodiment of the invention.
Figure 3:
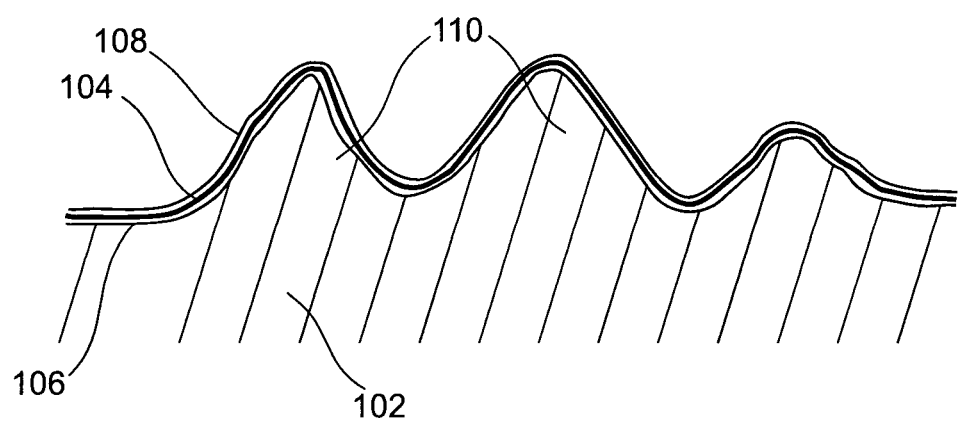
FIG. 3 is a simplified block diagram illustrating in an enlarged cross sectional view a detail of the exterior building component according to an embodiment of the invention; and, FIG. 4 is a simplified block diagram illustrating a modified commercial profile wrapping machine for implementing the method for manufacturing an exterior building component according to an embodiment of the invention.

Referring to FIGS. 1 to 3, an exterior building component 100 and a method for manufacturing the same—using an in-line manufacturing process—according to one embodiment of the invention are provided. FIG. 1 illustrates the various stations (I) to (VII) of the in-line manufacturing process with the substrate 102 being conveyed to and through the stations using conveyor 10 until the finished exterior building component 100 leaves the process at station (VII).

At station (I) the surface(s) of the substrate 102—where the barrier film 104 is to be disposed thereon—is dried to a predetermined moisture content, which is dependent on the barrier film assembly temperature, to avoid blisters. Wood, wood-fiber composite, or bio-fiber composite materials, can be dried to a surface moisture content of less than 4% for the surface reaching at least 60° C., using in one case an Infra-Red (IR) source 12. It is noted, that when other substrate materials with sufficiently dry surfaces are employed, the drying at station (I) may be omitted. It is further noted that the surface to be laminated of the substrate 102 may be cleaned, for example, to remove loose wood particles when the substrate material is rough sawn wood using a band saw—such as, for example, rough sawn pine, cedar or spruce boards.

At station (II), the temperature of the surface(s) of the substrate 102—where the barrier film 104 is to be disposed thereon—and, optionally, the temperature of the barrier film 104 are adjusted to the barrier film assembly temperature. The barrier film assembly temperature is in the temperature range between 60° C. and 200° C., in one case, between 80° C. and 130° C., with the barrier film assembly temperature being above the barrier film's glass transition temperature or above the melting temperature for a semi-crystalline polymer, depending on the type of polymer film employed.

The surface(s) of the substrate 102 and, optionally, the barrier film can be heated using IR heat sources 14 and 15, respectively, for heating the same in a continuous fashion. Alternatively, the surface(s) of the substrate 102 and, optionally, the barrier film are heated using other heat sources such as, for example, a hot air stream, or a microwave source. It is noted, that if the temperature of the surface(s) of substrate 102 is above the barrier film assembly temperature, as a result of previously performed drying, the same is cooled using, for example, a cold air stream, or ambient air.

At station (III), adhesive 106—having pressure sensitive characteristics in a temperature range below and including the barrier film assembly temperature—is disposed onto at least one of the surface(s) of the substrate 102 and the barrier film 104. For example, a one component reactive resin-based adhesive is disposed in the molten stage using conventional applicators followed by disposing the barrier film onto the surface(s) of the substrate 102 at station (IV) immediately thereafter.

Alternatively, a water-based adhesive may be disposed onto surface(s) of the substrate 102 prior (I) and (II) with excess water evaporating during the drying and heating process. The water-based adhesive may also be disposed onto the barrier film and dried prior assembly in station (IV), for example, during heating at station (II).

Further alternatively, a liquid, two-component 100% solid chemo-curable adhesive may be disposed onto at least one of the surface(s) of the substrate 102 and the barrier film 104 at station (III). Disposing of the barrier film onto the surface(s) of the substrate 102 at station (IV) is delayed for the adhesive viscosity to increase until a desired tackiness or green strength is achieved.

At station (IV), the barrier film 104 is disposed onto the surface(s) of the substrate 102 such that predetermined surface(s) or portions thereof are covered by the barrier film 104. Some additional heating of the film surface in contact with the substrate to facilitate barrier film embossment may be conducted at this point. Immediately thereafter, pressure is applied to the barrier film at station (V) for embossing the barrier film 104 such that a surface topography 110 of the surface(s) of the substrate 102 is replicated in a substantially identical fashion, as illustrated in FIGS. 2 and 3. The pressure is applied for a relatively short application time using in one case, a soft and light-weight roller 16 such as, for example, a roller similar to a sponge paint roller, with a pressure in a range between about 0.01 kg to 1 kg per cm of roller length when in contact with the barrier film 104, depending on the barrier film and process temperature. The pressure can be applied in a single pass, for example, while the substrate 102 with the barrier film 104 disposed thereon is conveyed under a stationary roller 16. Optionally, additional rollers 16 are employed, for example, for applying pressure onto the barrier film 104 disposed onto edge surfaces of the substrate 102. Further optionally, additional rollers 16 are placed further along the conveyor 10 for shortly applying pressure to the barrier film 104 as the exterior building component 100 cools.

At station (VI), a layer of paint 108 is disposed onto the embossed barrier film 104 using conventional painting technology such as, for example, vacuum box or spray painting. If required, the surface of the barrier film may be treated according to one of any known processes prior to lamination or painting to improve the adhesion of the glue or finishing coating to the barrier film surface. Finally, at station (VII) the finished exterior building component 100, as illustrated in FIGS. 2 and 3, leaves the process. The finished exterior building component 100 comprises substrate 102 having the barrier film 104 disposed onto at least a portion of a surface of the substrate 102 and adhered thereto. The barrier film 104 is embossed such that a surface topography 110 of the substrate 102 is replicated in a substantially identical fashion. For example, when applied to a rough sawn wood substrate, with the layer of paint 108 disposed onto the barrier film 104, the finished exterior building component 100 then has an appearance substantially identical to a painted wood surface. It is noted, that in case of composite substrates 102 the surface topography 110 may resemble different patterns such as, for example, bricks, or stone.

Optionally, the step of painting is omitted and the exterior building component 100 is sold absent the paint layer 108 disposed onto the barrier film 104 for the customer to paint the exterior building component 100, for example, after installation.

Further optionally, the step of painting is omitted and a clear or only slightly opaque barrier film 104 with UV blockers and UV light stabilizers is employed, providing the exterior building component 100 having the appearance of a clear lacquer finished natural looking wood product with the features of the wood texture visible.

The barrier film can be disposed to the exterior surface and at least two out of four edge surfaces of the exterior building component 100. The back surface is left open to allow any excess moisture to escape freely when it accidently enters the substrate 102 body. In the case of a siding board or panel, this design also takes advantage of "rain screens" where a gap is left between the siding and house wall to help with the escape of house moisture.

In order to manufacture the exterior building component 100, a barrier film 104 according to one embodiment of the invention is provided. The barrier film 104 is durable when exposed to the exterior, has sufficient elasticity for bridging cracks in the surface of the substrate 102 in a wide range of service temperatures, and is sufficiently pliable at the barrier film assembly temperature for facilitating the permanent embossment such that a surface topography 110 of the substrate 102 is replicated in a substantially identical fashion. In particular, the barrier film 104 can have the following characteristics:

High flexibility in low temperatures (below 0° C. and, in one case, down to −40° C. and below) with the tensile modulus of the barrier film being in the range of about 4-500 MPa at room temperature, with only a limited increase at 0° C., provides good crack bridging performance (bridging of cracks as large as 0.1 mm and, in one case, 1.5 mm at −20° C.);

Film has ability to control water and the water vapor permeability tested at 23° C. according to ASTM D1653 method B or ASTM E96 is in the range of about 0.01 g·mm/day·m$^2$ to about 20 g·mm/day·m$^2$, in one case in the range of about 0.1 g·mm/day·m$^2$ to about 10 g·mm/day·m$^2$; This water permeability may be controlled by the type of resin(s) and additives in the barrier film.

the glass transition temperature determined from tan delta curve as tested using a DMA or from DSC thermogram is below 0° C., in one case in the range of about −55° C. to 0° C., with the glass transition temperature measured during a temperature increase at a rate of 2° C./min; and, the thickness is in the range of about 5 microns to about 750 microns, in one case, in the range of 10 microns to 500 microns; and, good dimensional stability, when exposed to elevated temperature with limited shrinkage.

The barrier film 104 is made using variety of thermoplastic resin compounds containing, for example, styrenic block copolymers with dienes and other rubber related monomers, ethylene polymers and copolymers with propene, butene, hexene, octene. Polypropylene copolymers and blends with rubbers such as Ethylene Propylene Diene Monomer (EPDM) rubber or Ethylene Propylene (EP) rubber may also be employed. Resins may also be based on vinyl polymers, polyurethanes, polyesters, or their polymer blends including external plasticizers.

Some resins may be modified to improve adhesion, for example, by grafting maleic anhydride or improving mechanical properties including stress aging by crosslinking. For example, silane grafted polymers in barrier film will crosslink when exposed to environmental moisture during application water based coating and during service. Maleic anhydride grafted resins will improve adhesion of many adhesives and coatings.

The barrier film 104 may contain a variety of additives known by industry which could modify the film properties and influence the performance of the construction component. For example, it may contain UV absorbers in the form of organic compounds and pigments such as titanium oxide or carbon black, Variety of UV light stabilizers may be incorporated for further stabilization of the barrier film in case of coating damage and exposure of the film to exterior conditions may be an issue. Other additives may include a fire retardant system known for the resins used in the barrier film. Intumescent fire retardants may be considered. Many fire retardant systems may also cause wood charring in exposure to flame and would increase the flame retardancy of components containing wood or bio-fibers. Also, additives known to control water vapor transmission in plastic films such as zeolites may be employed. Addition of biocides would help in controlling bio-deterioration of both the finishing coating and substrate. Biocides such as borates have the ability to migrate into wood.

The process for manufacturing the building component disclosed herein is more environmentally friendly due to little or no release of organic volatiles because the barrier film and adhesive can be selected as effectively free of volatile organic compounds and the amount of paint required to finish the building component is at least 50% less than what is required for finishing without a barrier film.

The following are example implementations of the barrier film 104:

Example 1

A 50 mm twin screw extruder (L/D=22) with die with up to 15 stand capability, water cooling bath and pelletizer (Sino-Alloy Machinery Inc.—Taiwan) was fed with 50 p.b.w. Engage 8402 and 50 p.b.w. Engage 8003 polyethylene elastomer resins (Dow Chemical), 100 p.b.w. Jetfine 1H talc (Imerys), 1 p.b.w. Capow L 12/H titanate (Ken—React) in the form of 20% concentrate in Engage 8137, 1 p.b.w. Tinuvin 328 (BASF) and 1 p.b.w. Tinuvin 783-FDL (BASF). Also two color concentrates were added: carbon black based and white (titanium oxide) (Clariant) in quantities of 0.5 p.b.w. and 5 p.b.w., respectively. Materials were extruded in the form of 3 mm nominal diameter strands. The strand was then cooled in a water batch and pelletized using a strand pelletizer to obtain the compound used for film extrusion in Example 2.

Example 2

A ¾" single screw extruder equipped with a flat, cast film die was fed with the compound obtained in Example 1. Extruding conditions of the film are shown in Table 1. The obtained films with nominal thickness of 60 μm were then exposed to surface treatment on both sides by (a) flame (b) corona treatment with energy density 5 W/sq.ft./min. to Surface treatment of about +72 Dyne was achieved according to ASTM D2578. Film was tested for tensile properties, dimensional stability and water permeability as described in Table 2.

Example 3

A mixture of 100 and 33 p.b.w. of polyethylene resins, Engage 8130 and Engage 8003 (Dow Chemical), respectively, containing 0.5 p.b.w. maleic anhydride (Sigma Aldrich) and 0.1 p.b.w. Trigonox peroxide (Akzo Chemicals), was extruded using a flat cast film die to obtain 100 micron thick film. A ¾" single screw extruder equipped with a mixing screw with L/D ratio 24/1 (W. C. Brabender) was used for extrusion. Extrusion conditions are shown in Table 1. Film was then exposed to a propane gas flame for surface treatment of about 70 according to the Accu Dyne test as measured by application of an ink (Diversified Enterprises). Film was tested for tensile properties according to ASTM D822, and high temperature dimensional stability was tested by exposure on glass covered by powdered talc to about resin melting temperature. Testing results are shown in Table 2.

Example 4

A polyethylene copolymer resin, Engage 8402 (Dow Chemical). 1 p.b.w. Tinuvin328 and 1 p.b.w. Tinuvin 783-FDL was extruded using a flat cast film die to obtain 500 μm thick film. A ¾" single screw extruder equipped with a mixing screw with L/D ratio 24/1 (W. C. Brabender) was used for extrusion. Extrusion conditions are shown in Table 1. Film was then exposed to a propane gas flame for surface treatment of about 60 according to the Accu Dyne test as measured by application of an ink (Diversified Enterprises). Film was tested for tensile properties according to ASTM D822, and for high temperature dimensional stability by exposure on glass covered by powdered talc to about resin melting point as described in Example 1. Testing results are shown in Table 2.

Example 5

A twin screw compounding extruder D 6/2 (W. C. Brabender) was fed with 100 p.b.w. Engage 8137 (Dow Chemical) polyethylene resin, 100 p.b.w. Jetfine 1H (Imerys) talc, 1 p.b.w. Capow L 12/H titanate (Ken—React) in the form of 20% concentrate in Engage 8137, 1 p.b.w. Tinuvin328 (BASF) and 1 p.b.w. Tinuvin 783-FDL (BASF). Also, two color concentrates were added: carbon black based and white (titanium oxide/HDPE) (Clariant) in quantities of 0.5 p.b.w. and 10 p.b.w. respectively. Materials were extruded in the form of 3 mm nominal diameter strands under the conditions shown in Table 1. The strand was then cooled in a water batch and pelletized using strand pelletizer (Killion Extruders) to obtain the compound used for film extrusion in Example 6.

Example 6

A ¾" single screw extruder equipped with a flat, cast film die was fed with the compound obtained in Example 5. Extruding conditions of the film are shown in Table 1. The obtained films with nominal thickness of 50 μm was then exposed to a propane gas flame for surface treatment of about +72Dyne according to ASTM D2578. The film was tested for tensile properties according to ASTM D822, and for dimensional stability by exposure on glass covered by powdered talc to an elevated temperature of about 80° C. (near the resin melting temperature) (ASTM D1204) and tested for water vapor permeability according to ASTM E96. Testing results are shown in Table 2.

TABLE 1

Extrusion conditions for films

| Extrusion ID | Extrusion temperature (° C.) | | | | RPM | Torque (mg) |
| --- | --- | --- | --- | --- | --- | --- |
| | Zone 1 | Zone 2 | Zone 3 | Die | | |
| Example 1 | 175 | 180 | 210 | 175 | 100 | 2200 |
| Example 2 | 150 | 150 | 150 | 150 | 30 | 1800 |
| Example 3 | 175 | 180 | 210 | 175 | 60 | 1700 |
| Example 4 | 160 | 160 | 160 | 160 | 20 | 1200 |
| Example 5 | 100 | 180 | — | 180 | 60 | 7000 |

TABLE 2

Properties of films

| Film | Tensile Ultimate | | Dimensional Stability (%) | | Water Vapor Permeability g · mm/day · m$^2$ | | Glass Transition Temperature Tg (° C.) |
| --- | --- | --- | --- | --- | --- | --- | --- |
| | Stress (Mpa) | Elongation (%) | MD | TD | liquid water | water vapor | |
| 2 | 15.4 | 650 | 0 | −2.1 | 0.3 | 0.3 | −44.0 |
| 3 | 9.7 | 1650 | −40 | +11 | 0.34 | 0.34 | −44.8 |
| 4/5 | 3.6 | 900 | −3.7 | −1.5 | 0.16 | 0.18 | −41.0 |
| 6 | >3.5 | >600 | −12 | −9 | 0.3 | 0.3 | −44.5 |
| PS 8010* | 6.1 | 37 | −0.5 | 0.2 | 5.3 | 5.4 | −8.7 |

Tensile testing was done in transverse direction.
A negative dimensional stability indicates a contraction of the film while a positive dimensional stability indicates an expansion.
Numbers in brackets are the test standard deviation.
*Deerfield urethane The barrier film 104 is made: without pigmentation; or, with pigmentation. The formulation can include pigmentation using carbon black and titanium dioxide pigments.

Optionally, the barrier film 104 is formulated with flame retardants, biocides, and/or UV stabilizers.

Further optionally, in preparation for the depositing of the paint layer 108, the barrier film 104 is pre-oxidized using, for example, corona, plasma, or flame oxidization.

The barrier film 104 has good dimensional stability.

Optionally, the barrier film 104 comprises a polymer with grafted methoxy or ethoxy silanes for crosslinking, for example, to increase barrier film resistance to mechanical aging.

Further optionally, the resin of the barrier film 104 is chemically modified to improve adhesion, for example, by grafting of maleic anhydride.

In order to manufacture the exterior building component 100, the adhesive 106 has the following characteristics:
- the adhesive 106 effectively does not release excessive quantities of Volatile Organic Compounds (VOCs);
- adheres to laminated surfaces and applied film to the point that failure type occurring during ASTM D5179 adhesion testing will indicate cohesive fracture;
- the adhesive 106 exhibits characteristics of pressure sensitive adhesives in a temperature range below and including the barrier film assembly temperature, with sufficient green strength when in contact with barrier film 104 and the surface(s) of the substrate 102 for retaining the barrier film 104 after embossing in a shape replicating the surface topography 110 of the surface(s) of the substrate 102 in a substantially identical fashion, as well as sufficiently long open time (assembly window) for barrier film assembly and barrier film embossment without creation of wrinkles;
- the green strength of the adhesive does not obstruct the release of air from the barrier film-substrate interface during barrier film assembly and barrier film embossment;
- the adhesive is capable of stabilizing loose wood fibers and repairing checks/cracks; and,
- the adhesive, during the service life of the exterior building component 100, has good exterior performance as required by specific service conditions. In case of siding boards, this may include:
  - resistance to moisture during prolonged exposure time;
  - good durability in a wide temperature range between −40° C. and 80° C.; and,
  - flexibility to allow for substrate movement caused by thermal expansion/contraction and/or moisture uptake/release.

There are various commercially available adhesives 106 having the above characteristics such as, for example, adhesives based on epoxy, polyurethane, polyacrylic, and polyvinyl resins. Alternatively, other resins commonly used in the manufacturing of exterior wood adhesives may be formulated to meet the above characteristics. Alternatively, a variety of hot melt reactive adhesives can be also used including polyurethanes (PUR). Further alternatively, a blend of different types of adhesives may also be used.

Example 7

Figure 4:
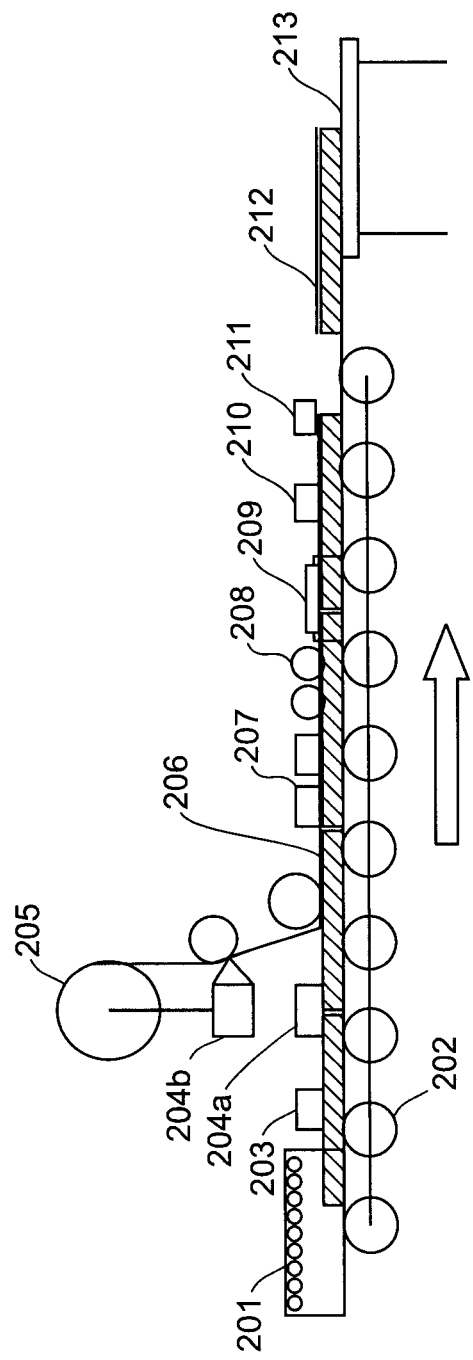

A commercial lamination machine designed for wrapping profiles was modified by addition of IR heaters and embossing foam rollers as illustrated in FIG. 4 with the following components listed in the sequence of production as indicated by the block arrow:

201—IR Heaters
202—Conveyor Rollers
203—Infeed Heaters
204a—Glue Applicator (to Board)
204b—Glue Applicator (to Film)
205—Barrier Film Roll
206—Construction Components (Boards)
207—Embossment Heaters
208—Embossment Rollers
209—Edge Wrapping
210—Cooling Hose
211—Board Separator
212—Applied Film
213—Landing Table The lamination machine was fed with corona treated film made according to Example 2. Polyurethane Adhesive 708.6 Kleiberit) was used and applied to film using machine glue applicator. Spruce siding boards 3' long and 5⅜" wide were used for lamination with line speed about 50 ft/min with potential to increase speed to about 200 ft/min or higher. The temperature of the board surface at the end of the dryer was 160° C., the assembly temperature was 110° C. and the embossment temperature was 105° C. The film was laminated to the board rough sawn face surface and long edges. The wood texture was replicated on the film adhering to the board faces. Laminated boards were stored for a few hours at room temperature to allow glue setup, then painted with architectural latex paint using a commercial paint line with vacuum coater operated at about 250 ft/min. The paint was forced dry in an IR oven at a temperature of about 70° C. Film adhesion and painted boards surface topography are shown in Table 3.

Example 8

The lamination machine designated for wrapping profiles was modified as described in Example 7 and was fed with flame treated film made according to Example 2. For the lamination 3' long and 5⅜" wide spruce siding boards were used. Boards were dried in an IR oven at about 160° C. for about 60 s. Adhesive comprising 100 p.b.w. DER 324 epoxy resin (Dow Chemical), 20 p.b.w. Gaberpro GPM 800 (Gabriel Performance Products), Versamid 140 (BASF), and 2 p.b.w. DMP-30 (Huntsman) was applied to pre-heated boards' rough sawn face surface and long edges at a temperature 80° C. with spread about 150 g/sq.m. and pre-cured for approximately 60 s. Then the boards were released on the lamination line and laminated with the film described in Example 6 with a line speed of about 50 ft/min. The wood texture was replicated on the film adhering to the board faces. The laminated boards were stored allowing the adhesive to sufficiently cure and then painted by brush with architectural latex paint. The paint was forced dry in an IR oven at a temperature of about 70° C. The film adhesion and painted boards surface topography is shown in Table 3.

Example 9

100 pbw epoxy resin DER 324 (Dow Chemical) was premixed with 5 pbw hardener DEH 24 (Dow Chemical), 60 pbw Versamide 140 (BASF) and 1 pbw DMP 30 (Huntsman) to prepare an adhesive. After an induction time. the adhesive was applied with a spread about 140 g/sq.m to a preheated pine board with several knots and small surface cracks and checks. Film made as described in Example 3 was flame treated to Dyne+72 with a propane torch and laid on the board with the treated side towards the adhesive. The assembly was then maintained at 80° C. for about 120 s to obtain the required tackiness of the adhesive. The film surface was rolled with a 5 cm diameter soft urethane foam roller with a force under 100 g/cm roller length. The board was then cooled to ambient temperature and after initial adhesive curing the surface was again flame treated to +72 Dyne. The exterior wood paint MachineCoat made by PPG was applied with about 6 mils wet film thickness. Paint was allowed to dry to complete finishing. The board was tested for interlaminar adhesion according to ASTM D 5179 and visually inspected with respect to replication of the rough sawn wood pattern to the finished product. Testing results are shown in Table 3.

Example 10

100 pbw of Epoxy resin DER 324 (Dow Chemical) was mixed with 30 pbw Gaberpro GPM 800 (Gabriel Performance Products), 3.2 parts DEH 24 (Dow Chemical), 8.8 pbw Versamide 140 (BASF) and 1 pbw DMP 30 (Huntsman). The mixture was applied to a rough sawn pine siding board preheated at the surface to 80° C., with a spread of approx. 150 g/sq.m. The film made as described in Example 6 was flame treated to Dyne+72 with a propane torch and laid on the board with the treated side towards the adhesive. The assembly was then IR heated for about 30 s to maintain 80° C. as measured by IR thermometer and the surface was rolled with a 5 cm diameter soft urethane foam roller with force under 100 g/cm roller length. The board was then cooled to ambient temperature and after initial adhesive curing, the surface was again flame treated to +72 Dyne. The exterior wood paint MachineCoat made by PPG was applied with about 6 mils wet film thickness. Paint was allowed to dry to complete finishing. The board was tested for interlaminar adhesion according to ASTM D 5179 and visually inspected with respect to replication of the rough sawn wood pattern to the finished product. Testing results are shown in Table 3

Example 11

Epoxy adhesive as described in Example 6 was applied to rough sawn spruce siding board preheated to 80° C. Polyurethane film PS 8010 about 75 μm thick made by Deerfield Urethane (Bayer) was flame treated to 48 Dyne and laid on the adhesive coated board. The assembly was then heated by IR and hot air blower to about 120° C. for about 20 s as measured by IR thermometer. The film surface was rolled with a 7.5 cm diameter soft foam urethane roller with a force under 200 g/cm roller length. After adhesive curing, the laminated board was evaluated for interlaminar adhesion according to ASTM D5179 and visual surface appearance with respect to replication of the rough sawn wood pattern to the film surface. Testing data are shown in Table 3.

Example 12

Epoxy adhesive described in Example 10 was applied with a spread 75 g/sq.m. to the flame treated surface of barrier film made according to Example 6. A cement-cellulose fiber siding board with distinct wood texture (James Hardie Building Products Inc.) was preheated to 80° C. using IR oven. Barrier film with adhesive was placed on the preheated board surface and further heated for approximately 30 s to maintain a temperature of about 80° C. as measured by IR thermometer. After that, the film surface was rolled with a 5 cm diameter soft foam urethane roller with a force under 100 g/cm roller length. The laminated board surface was again flame treated and was finished with Behr Premium Plus exterior semi-gloss enamel. After paint was dried, the siding board was evaluated for interlaminar adhesion according to ASTM D5179 and visually inspected with respect to replication of the board surface topography imitating sawn wood. Testing data are shown in Table 3.

Example 13

Epoxy resin DER 917 (Dow Chemical) was mixed with epoxy hardener DEH 800 (Dow Chemical) in ratio 10:9.5 respectively and applied to sawn cedar deck board with spread 180 g/sq.m. Board with adhesive was preheated gradually to 80° C. as measured by IR thermometer on the wood surface. Barrier film made with 500 μm nominal thickness according to Example 2 was placed over the adhesive and preheated to 70° C. The assembly was then IR heated for about 30 s to maintain 70° C. and surface was rolled with a 7.5 cm diameter soft urethane foam roller with a force under 300 g/cm roller length. The board was then cooled to ambient temperature. After adhesive cure, the board was tested according to ASTM D5179 for interlaminar adhesion and visually inspected with respect to replication of the rough sawn wood pattern to the finished product. Testing results are shown in Table 3

Example 14

Acrylic pressure sensitive adhesive Rhoplex N560 was blended with acrylic latex Rhoplex WL91 with ratio 4:1. The mixture was applied to rough sawn pine siding board preheated to 80° C. with a spread of approx. 150 g/sq.m. Film made as described in Examples 4-6 was flame treated to Dyne+70 with a propane torch and laid on the board with the treated side towards the adhesive. The assembly was then IR heated for about 30 s to maintain 80° C. and the surface was rolled with a soft urethane foam roller with a force under 100 g/cm roller length. The board was then cooled to ambient temperature and after initial adhesive curing, the surface was again flame treated to +70 Dyne. The exterior wood paint MachineCoat made by PPG was applied with about 6 mils wet film thickness. Paint was dried to complete finishing. Board was tested for interlaminar adhesion according to ASTM D5179 and visually inspected with respect to replication of the rough sawn wood pattern to the finished product. Testing results are shown in Table 3.

Example 15

Five boards finished with barrier film as described in Example 9 were exposed to exterior conditions in Vancouver BC, Canada. The boards were attached to a vertical testing wall, with three boards facing south and two facing north. Exposed boards were inspected every 6 months. No environmental damage to wood or finish was detected before or and during inspection after 42 months of exposure.

TABLE 3

Adhesion and texture transfer

| Board | Film surface topography* | Adhesion of film to substrate N/sq. cm | Adhesion of paint to film N/sq. cm | Adhesion ASTM D3359 |
|---|---|---|---|---|
| Example 7 | 5 | 273 | 228 | |
| Example 8 | 5 | 253 | 403 | |
| Example | 4 | 124 | | 5A** |

TABLE 3-continued

Adhesion and texture transfer

| Board | Film surface topography* | Adhesion of film to substrate N/sq. cm | Adhesion of paint to film N/sq. cm | Adhesion ASTM D3359 |
|---|---|---|---|---|
| Example 9 | | | | |
| Example 10 | 5 | 195 | | 5A** |
| Example 11 | 4 | 205 | | 5A** |
| Example 12 | 5 | 45 | | 5A** |
| Example 13 | 5 | 176 | | 5A** |
| Example 14 | 4.5 | 41 | | 5A** |

*Surface Topography
1) No degree of wood surface replication; no embossment details achieved
2) Poor degree of wood surface replication; minimal embossment details achieved
3) Moderate degree of wood surface replication; coarse embossment details achieved
4) Good degree of wood surface replication; fine embossment details achieved
5) Excellent degree of wood surface replication; full range of embossment details achieved
**Rating according to ASTM D3359

The paint 108 can be an acrylic latex paint designated for exterior wood finishing. The dry film thickness of the paint layer 108 is in the range of 18 microns to 500 microns, in one case in the range of 38 microns to 63 microns, as measured by micrometer or according to ASTM D5235 after application to a wood based substrate. The water vapor permeability is in the range of 0.05 g·mm/day·m$^2$ to 50 g·mm/day·m$^2$, in one case in the range of 0.1 g·mm/day·m$^2$ to 1 g·mm/day·m$^2$ tested at 23° C. according to ASTM E96.

The above in-line manufacturing process according to an embodiment of the invention enables manufacturing of the exterior building component 100 at a high speed of 50 ft/min or more—as, for example, in Example 7—i.e. the barrier film is embossed with the surface topography of the substrate at the same high speed. Assuming the line speed to be only 33 ft/min and the effective contact length of the embossment roller with the barrier film is 1 cm, the barrier film deformation occurs at a frequency of approximately 17 Hz. At this frequency dynamic properties of the polymer—where polymer molecules slide and deform—become important. To deform the thermoplastic barrier film permanently (plastic deformation) without rebound, the polymer molecules have to slide completely against one another.

Therefore, the barrier film according to an embodiment of the invention comprises a compound that allows enhanced resin flow (plastic deformation) to reduce the demand for molecule deformation (elastic deformation). The compound also inhibits resin shape memory associated with elastic deformation of the polymer molecules which accompany the flow. This inhibitor may be, for example, a filler such as talc added to the barrier film compound. With such a barrier film there is no need for the adhesive to have a significant initial bonding strength during the very short time period of substrate surface topography transfer—in the range of one hundredth to one thousandth of a second—in the embossment process to obtain good surface replication.

For a given in-line embossment process good surface replication is achieved by:
(1) selecting the resin with appropriate resin flow at the chosen replication temperature;
(2) compounding the resin with an additive to inhibit resin shape memory; and,
(3) selecting the adhesive for the chosen replication temperature and residual film stresses to eliminate film retraction from valleys of the replicated surface topography.

The quality of the substrate surface topography replication depends on several factors such as:
(1) type of the substrate surface and surface topography (surface roughness);
(2) embossment process speed;
(3) chosen replication temperature which depends, for example, on type of substrate and type of barrier film;
(4) barrier film material properties including: mechanical properties at elevated process temperature, resin flow characteristics at chosen process temperature and design for retardation of plastic memory; and,
(5) adhesive initial strength at process temperature and below during cooling (additional thermal contraction stresses occur in the barrier film).

The elastic behavior and resin flow (plastic deformation) as a function of temperature and frequency of deformation can be tested using Dynamic Mechanical Analyzer (DMA) following procedures described in ASTM D4065. The measured tan δ represents the portion of total rigidity of the material that is attributable to resin flow, i.e. the higher tan δ the tested material is more likely to experience resin flow. DMA testing of the barrier film described in Example 2 revealed unexpectedly, that tan δ increases with increasing test frequency and temperature. For example, at a temperature of 110° C. and frequencies of 0.1 Hz, 10 Hz, and 100 Hz tan δ increased from 0.11 to 0.16 and to 0.84, respectively. At temperature of 105° C. and frequency of 100 Hz tan δ was 0.4.

Therefore, for a chosen embossment process temperature a suitable barrier film may be selected as the barrier film having the highest tan δ at the chosen process temperature. Further the embossment roller system may be designed such that it provides a predetermined embossment time and frequency where tan δ of the selected barrier film is the highest.

The present invention has been described herein with regard to certain embodiments. However, it will be obvious to persons skilled in the art that a number of variations and modifications can be made without departing from the scope of the invention as described herein.

What is claimed is:
1. An exterior building component manufactured using a method comprising:
 providing a substrate with a textured surface having distinct features;
 providing a thermoplastic barrier film;
 providing an adhesive;
 adjusting a temperature of a surface of the substrate to a thermoplastic barrier film assembly temperature;
 disposing the adhesive onto at least one of the surface of the substrate and the thermoplastic barrier film;
 disposing the thermoplastic barrier film onto the surface of the substrate;
 adjusting the thermoplastic barrier film temperature; and,
 applying pressure to the thermoplastic barrier film using a roller which applies low pressure with short pressure application time;
 the building component comprising:
 the substrate with the textured surface having the distinct features; and,
 the thermoplastic barrier film disposed onto at least a portion of the textured surface of the substrate and adhered thereto, the thermoplastic barrier film following the features of the textured surface such that the thermoplastic barrier film displays the features of the textured surface of the substrate.

2. The exterior building component according to claim 1 wherein the substrate comprises one of wood, wood-based composite, bio-fiber based composite and cementitious composite containing inorganic and/or bio fibers.

3. The exterior building component according to claim 2 wherein the substrate surface has rough sawn wood texture.

4. The exterior building component according to claim 1 comprising protective coating disposed onto the thermoplastic barrier film.

5. The exterior building component according to claim 1 wherein the thermoplastic barrier film has an average thickness in the range of about 10 microns to 750 microns.

6. The exterior building component according to claim 4 wherein the protective coating applied to the thermoplastic barrier film has an average dry film thickness in the range of 18 microns to 150 microns.

7. An exterior building component comprising:
a substrate with a textured surface having distinct features; and,
a thermoplastic barrier film disposed onto at least a portion of the textured surface of the substrate and adhered thereto, the thermoplastic barrier film following the features of the textured surface such that the thermoplastic barrier film displays the features of the textured surface of the substrate.

8. The exterior building component according to claim 7 wherein the thermoplastic barrier film has:
a water vapor permeability in the range of 0.01 g·mm/day·m$^2$ to 20 g·mm/day·m$^2$ at 23° C. tested according to ASTM E96 or D1657; and,
a glass transition temperature below 0° C. determined from tan delta curve as tested using a DMA at 10 Hz.

9. The exterior building component according to claim 7 wherein the substrate is rough sawn wood with a distinct surface texture displaying wood grains.

10. The exterior building component according to claim 7 wherein the substrate comprises one of wood, wood-based composite, bio-fiber based composite and cementitious composite containing inorganic and/or bio fibers.

11. The exterior building component according to claim 10 wherein the substrate surface has rough sawn wood texture.

12. The exterior building component according to claim 7 comprising protective coating disposed onto the embossed thermoplastic barrier film.

13. The exterior building component according to claim 7 wherein the thermoplastic barrier film has an average thickness in the range of about 10 microns to 750 microns.

14. The exterior building component according to claim 12 wherein the protective coating applied to the thermoplastic barrier film has an average dry film thickness in the range of 18 microns to 150 microns.

15. The exterior building component according to claim 1 wherein the thermoplastic barrier film has a smooth surface.

16. The exterior building component according to claim 1 wherein the thermoplastic barrier film displays only the features of the textured surface of the substrate.

* * * * *